No. 692,574. Patented Feb. 4, 1902.
J. WILCOX.
END GATE.
(Application filed Jan. 4, 1901.)
(No Model.)
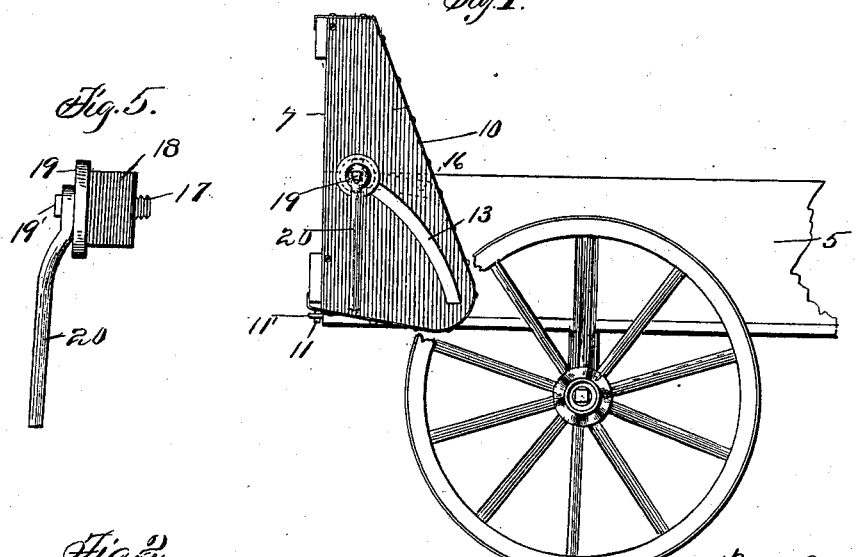
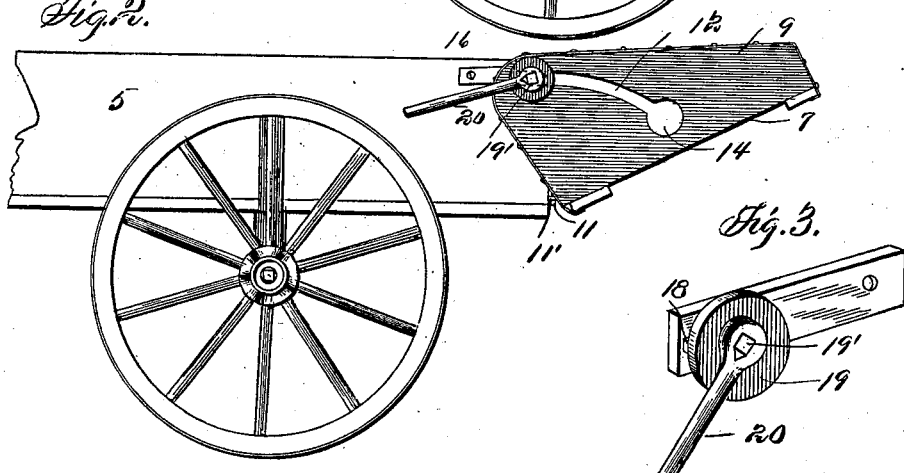
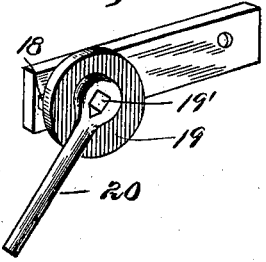
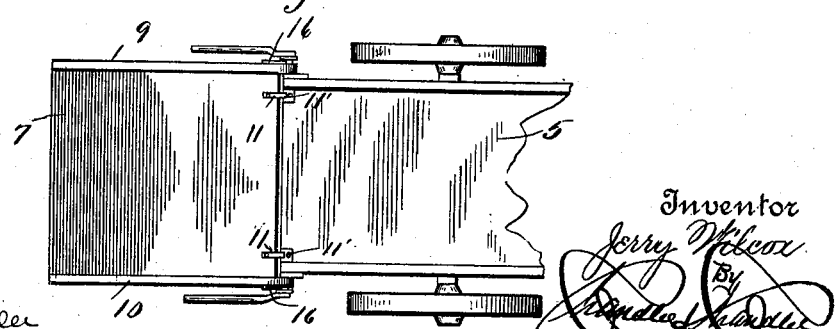
Witnesses
E. A. Ryan
W. L. Chandler
Inventor
Jerry Wilcox
By Chandler & Chandler
Attorneys

UNITED STATES PATENT OFFICE.

JERRY WILCOX, OF SCHUYLER, NEBRASKA.

END-GATE.

SPECIFICATION forming part of Letters Patent No. 692,574, dated February 4, 1902.

Application filed January 4, 1901. Serial No. 42,053. (No model.)

*To all whom it may concern:*

Be it known that I, JERRY WILCOX, a citizen of the United States, residing at Schuyler, in the county of Colfax and State of Nebraska, have invented certain new and useful Improvements in End-Gates; and I do hereby declare the following to be a full, clear, and exact description of the invention, such as will enable others skilled in the art to which it appertains to make and use the same.

This invention relates to end-gates for wagons; and it has for its object to provide a gate in the form of a scoop, which will be so attached to the body as to be readily lowered to operative position and raised to position to close the end of the body, the object of the invention being to provide a simple and efficient means for holding the gate in its closed position and for releasing it to permit it to unfold, further objects and advantages of the invention being evident from the following description.

In the drawings forming a portion of this specification and in which like numerals of reference indicate similar parts in the several views, Figure 1 is a side elevation showing the gate in its closed position, one of the holding devices being shown with its supporting-link in dotted lines. Fig. 2 is a view showing the gate in open position. Fig. 3 is a detail perspective view of one of the locking devices. Fig. 4 is a top plan view showing the gate in a lowered position, and Fig. 5 is an elevation of one of the locking members.

Referring now to the drawings, 5 represents the body of a wagon having an open rear end, and at this rear end and secured to the bottom of the body is a pintle-rod, which extends transversely of the body.

In connection with the body of the wagon there is employed an end-gate in the form of a scoop 7, this gate including a bottom 8, having sides 9 and 10 secured thereto, said gate being hinged to the bottom of the wagon-body through the medium of hooks 11 upon the bottom thereof, which are engaged with ears 11' on the wagon-body.

When the gate is in its closed position, (shown in Fig. 1,) the sides thereof lie against the outer faces of the body of the wagon, and when the gate is in open position the sides thereof slide rearwardly until only those portions adjacent to the rear edges of the sides are against the sides of the body.

Through the sides 9 and 10 of the gate are formed arc-shaped slots 12 and 13 of equal radii and struck from the ears 11' as a center, the ends of these slots at the front edges of the sides of the gate terminating in annular enlargements 14.

Pivoted to the outer faces of the sides of the body 5 are links 16, which extend rearwardly from their pivots, and rotatably mounted in the rear ends of these links are stub-shafts 17, these shafts being flattened beyond the links, so that there are formed, in effect, plates 18, having the ends of the stub-shafts as trunnions. At the outer ends of the plates 18 are formed annular heads 19, lying in planes at right angles to the plates, the plates being disposed in the arc-shaped slots of the sides of the end-gate and with the annular heads lying against the outer faces thereof. Against the outer faces of the heads are disposed levers 20, having angular openings which receive angular studs 19' on the heads 19, and through the medium of these levers the plates are rotated.

The operation of the mechanism is as follows: When the end-gate is raised to its closed position, the plates 18 lie in the annular enlargements of the slots in the sides of the gate, and by means of the levers they may be turned to lie across the ends of the narrowed portions of the slots, so as not to be drawn thereinto, and they thus act to prevent movement of the end-gate. When the gate is to be lowered, the shafts are operated to rotate the plates so as to enter the slots, and the gate may be then swung rearwardly and downwardly, at which time the plates travel through the slots. At any time the gate may be raised, and when in closed position the shafts are manipulated to turn the plates to lie across the slots and hold the gate closed. If desired, the slots may be enlarged at other portions, so that the gate may be held in different positions.

To prevent jamming of the plates 18 in the slots, the links 16 are provided, and thus if the slots be not centered absolutely upon the ears 11' these links will rise or fall to compensate for any eccentricity.

What is claimed is—

1. The combination with a wagon-body of an end-gate hinged to the bottom thereof and having sides disposed to inclose the sides of the body, the sides of the gate having arcuate slots terminating in lateral enlargements, and plates pivotally mounted and connected with the body, said plates being disposed for adjustment to move through the slots or to lie transversely in the enlargements of the slots to hold the gate against movement, the widths of the plates being greater than the widths of the slots adjacent to the enlargements.

2. The combination with a wagon-body, of an end-gate hinged thereto and having sides between which the sides of the body are received, the sides of the gate having arcuate slots therein, links pivoted to the body, plates pivoted to the links and disposed for movement through the slots, the plates being wider than the slots, said slots having laterally-enlarged portions, and means for rotating the plates in the enlarged portions of the slots to lie transversely thereof and with their edges beyond the narrowed portions of the slots to hold the gate in closed position.

In testimony whereof I hereunto sign my name, in the presence of two subscribing witnesses, on the 14th day of November, 1900.

JERRY WILCOX.

Witnesses:
GEO. W. WERTZ,
G. N. WELLS.